(12) United States Patent
Mori et al.

(10) Patent No.: US 10,920,867 B2
(45) Date of Patent: Feb. 16, 2021

(54) DIFFERENTIAL DEVICE

(71) Applicant: MUSASHI SEIMITSU INDUSTRY CO., LTD., Toyohashi (JP)

(72) Inventors: Hiroyuki Mori, Toyohashi (JP); Hirohisa Oda, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/497,991

(22) PCT Filed: Mar. 20, 2018

(86) PCT No.: PCT/JP2018/011139
§ 371 (c)(1),
(2) Date: Sep. 26, 2019

(87) PCT Pub. No.: WO2018/180804
PCT Pub. Date: Oct. 4, 2018

(65) Prior Publication Data
US 2020/0040977 A1    Feb. 6, 2020

(30) Foreign Application Priority Data

Mar. 30, 2017  (JP) ................. 2017-067250

(51) Int. Cl.
*F16H 48/40*  (2012.01)
*F16H 48/08*  (2006.01)
*F16H 48/38*  (2012.01)

(52) U.S. Cl.
CPC ............. *F16H 48/40* (2013.01); *F16H 48/08* (2013.01); *F16H 48/38* (2013.01); *F16H 2048/085* (2013.01)

(58) Field of Classification Search
None
See application file for complete search history.

(56) References Cited

U.S. PATENT DOCUMENTS

| | | | |
|---|---|---|---|
| 7,470,207 B2 * | 12/2008 | Todd ................ | F16H 48/08 475/230 |
| 9,140,352 B2 | 9/2015 | Inukai et al. | |
| 2009/0075777 A1 * | 3/2009 | Han ................. | F16H 48/08 475/230 |

FOREIGN PATENT DOCUMENTS

| | | |
|---|---|---|
| CN | 202441834 U | 9/2012 |
| JP | S55-92955 U | 6/1980 |

(Continued)

*Primary Examiner* — Timothy Hannon
(74) *Attorney, Agent, or Firm* — Carrier Blackman & Associates, P.C.; Joseph P. Carrier; William D. Blackman

(57) ABSTRACT

A differential device includes a plurality of differential gears, a plurality of differential gear support members respectively supporting the plurality of differential gears, a pair of output gears meshing with each of the plurality of differential gears, a support member having a plurality of opposite ends-supporting parts supporting opposite end parts of the respective differential gear support member, and a space being formed in a middle part of the support member, a recess part being formed between two of the opposite ends-supporting parts of the support member that are adjacent to each other, the recess part extending from an outside in a radial direction of the support member toward an inside in the radial direction, each of the plurality of opposite ends-supporting parts having one support portion supporting at least one end part of the differential gear support member, and a through hole being formed in the one support portion.

7 Claims, 4 Drawing Sheets

(56) References Cited

FOREIGN PATENT DOCUMENTS

| JP | H07-279631 | A | 10/1995 |
| JP | H07-279632 | A | 10/1995 |
| JP | 2012-149692 | A | 8/2012 |
| JP | 2014-105838 | A | 6/2014 |
| JP | 5742778 | B2 | 7/2015 |
| JP | 2016-084935 | A | 5/2016 |

\* cited by examiner

DIFFERENTIAL DEVICE

TECHNICAL FIELD

The present invention relates to a differential device mounted on a vehicle such as for example a four-wheeled automobile.

BACKGROUND ART

In a differential device, a technique for supporting a pinion shaft by a support member via two points is conventionally known (for example Patent Documents 1 to 4). The structure of a flat differential device is also already known (for example Patent Document 5).

RELATED ART DOCUMENTS

Patent Documents

Patent Document 1: Chinese Utility Model No. 202441834
Patent Document 2: Japanese Patent Application Laid-open No. 7-279632
Patent Document 3: Japanese Patent Application Laid-open No. 7-279631
Patent Document 4: American Patent No. 7470207 Specification
Patent Document 5: Japanese Patent No. 5742778

SUMMARY OF THE INVENTION

Problems to be Solved by the Invention

However, Patent Documents 2 to 4 do not mention improvement in the ease of lubrication of a pinion gear by taking in lubricating oil from the exterior of a differential device. Furthermore, in Patent Document 1, lubricating oil in the exterior of a differential device can be taken in from a cover side covering a side gear, but it is difficult to take in lubricating oil in the exterior of a differential device from the radially outer side of a support member.

The present invention has been accomplished in light of the above circumstances, and it is an object thereof to provide a differential device that can improve the lubrication performance of a pinion gear (differential gear) by taking in lubricating oil that is in the exterior of the differential device into the differential device from a support member side.

Means for Solving the Problems

In order to attain the above object, a differential device according to one embodiment of the present invention comprises a plurality of differential gears, a plurality of differential gear support members respectively supporting the plurality of differential gears, a pair of output gears meshing with each of the plurality of differential gears, a support member having a plurality of opposite ends-supporting parts supporting opposite end parts of the respective differential gear support member, a space being formed in a middle part of the support member, a first cover member disposed on a back face side of one of the output gears and capable of being joined to the support member, and a second cover member disposed on a back face side of the other output gear and capable of being joined to the support member, a recess part being formed between two of the opposite ends-supporting parts of the support member that are adjacent to each other, the recess part extending from an outside in a radial direction of the support member toward an inside in the radial direction, each of the plurality of opposite ends-supporting parts having one support portion supporting at least one end part of the differential gear support member, and a through hole being formed in the one support portion, the through hole extending through the one support portion.

Preferably, the support member has a plurality of wall parts each equipped with the opposite ends-supporting part, and an opening from an outside to an inside of the wall part is formed in at least one of the wall parts.

Preferably, with regard to the support member, a depression part is formed in a face of the recess part forming one side face or bottom face, the depression part being directed from the outside in the radial direction to the inside in the radial direction of the support member.

In order to attain the above object, a differential device according to the other embodiment of the present invention comprises a plurality of differential gears, a plurality of differential gear support members respectively supporting the plurality of differential gears, a pair of output gears meshing with each of the plurality of differential gears, a support member having a plurality of opposite ends-supporting parts supporting opposite end parts of the respective differential gear support member and a plurality of linking parts linking two of the plurality of opposite ends-supporting parts that are adjacent to each other, a space being formed in a middle part of the support member, a first cover member disposed on a back face side of one of the output gears and capable of being joined to the support member, and a second cover member disposed on a back face side of the other output gear and capable of being joined to the support member, the linking part and a recess part being formed between two of the opposite ends-supporting parts of the support member that are adjacent to each other, the linking part being on an inside in a radial direction of the support member and the recess part being on an outside in the radial direction of the support member, a space in the radial direction being formed in the linking part, the space extending in the radial direction of the support member between the linking part and the first cover member and second cover member, each of the plurality of opposite ends-supporting parts having one support portion supporting at least one end part of the differential gear support member, and a through hole being formed in the one support portion, the through hole extending through the one support portion.

In order to attain the above object, a differential device according to the other embodiment of the present invention comprises a plurality of differential gears, a plurality of differential gear support members respectively supporting the plurality of differential gears, a pair of output gears meshing with each of the plurality of differential gears, a support member having a plurality of wall parts comprising opposite ends-supporting parts supporting opposite end parts of the respective differential gear support member, a first cover member disposed on a back face side of one of the output gears and capable of being joined to the support member, and a second cover member disposed on a back face side of the other output gear and capable of being joined to the support member, two of the wall parts that are adjacent to each other being connected directly or by means of a plurality of linking parts, a recess part being formed between two of the wall parts that are adjacent to each other, the recess part being recessed from an outside in a radial direction of the support member toward an inside in the radial direction, and an opening from an outside to an inside of the wall part being formed in at least one of the wall parts.

In order to attain the above object, a differential device according to the other embodiment of the present invention comprises a plurality of differential gears, a plurality of differential gear support members respectively supporting the plurality of differential gears, a pair of output gears meshing with each of the plurality of differential gears, a support member having a plurality of wall parts and a plurality of linking parts linking two of the wall parts that are adjacent to each other, the plurality of wall parts having opposite ends-supporting parts supporting opposite end parts of the respective differential gear support member and a side face part connecting the opposite ends-supporting parts, a first cover member disposed on a back face side of one of the output gears and capable of being joined to the support member, and a second cover member disposed on a back face side of the other output gear and capable of being joined to the support member, the linking part and a recess part being formed between two of the wall parts of the support member that are adjacent to each other, the linking part being on an inside in a radial direction of the support member and the recess part being on an outside in the radial direction of the support member, and a space in a peripheral direction being formed in the side face part, the space extending in the peripheral direction of the support member between the side face part and each of the first cover member and the second cover member.

Effects of the Invention

In accordance with the present invention, it is possible to improve the lubrication performance of a differential gear by taking in lubricating oil outside a differential device from a support member side into the differential device.

EXPLANATION OF REFERENCE NUMERALS AND SYMBOLS

Figure 1:
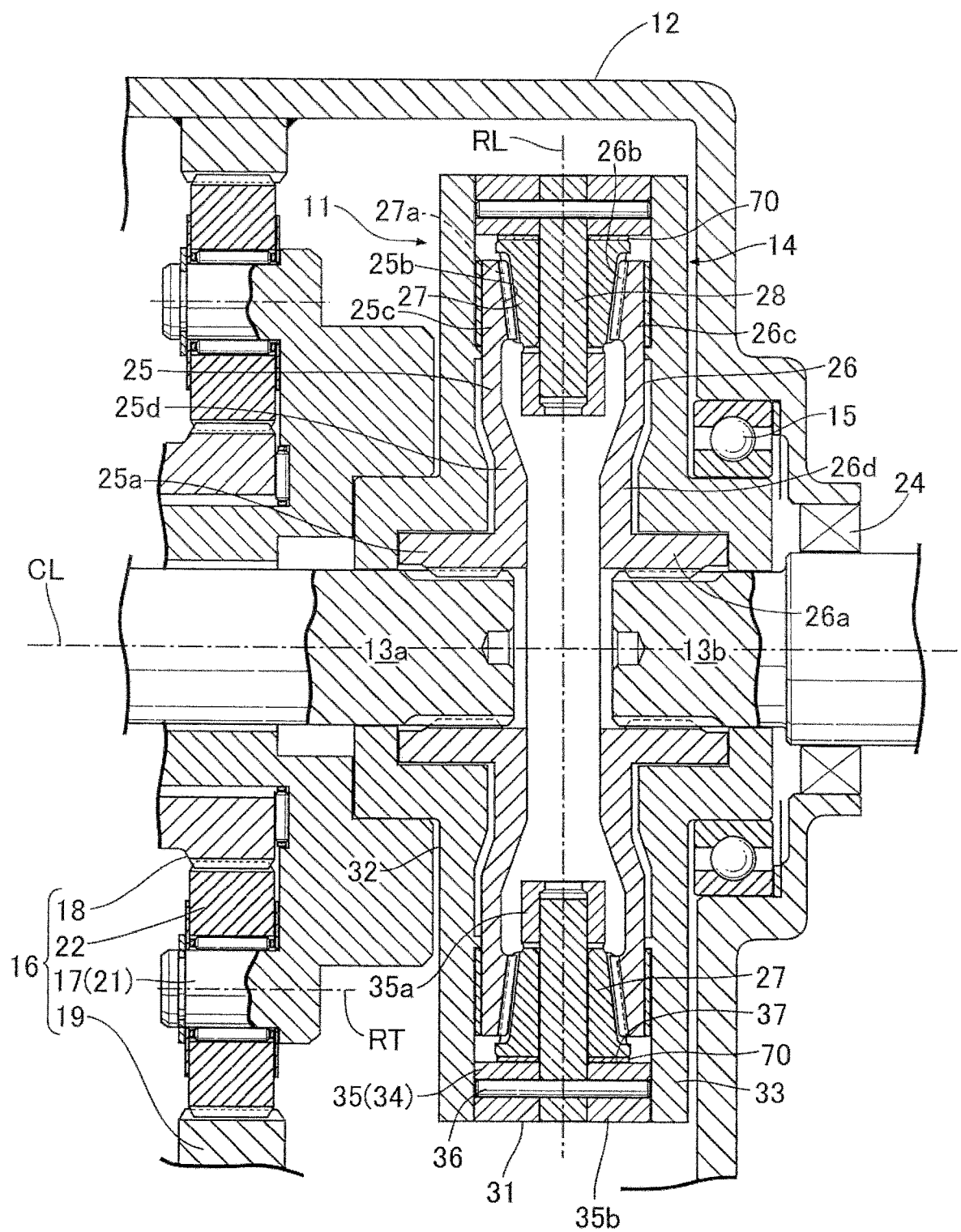
FIG. 1 is a vertical sectional view schematically showing the overall arrangement of a differential device related to a first embodiment of the present invention. (first embodiment)
Figure 2:
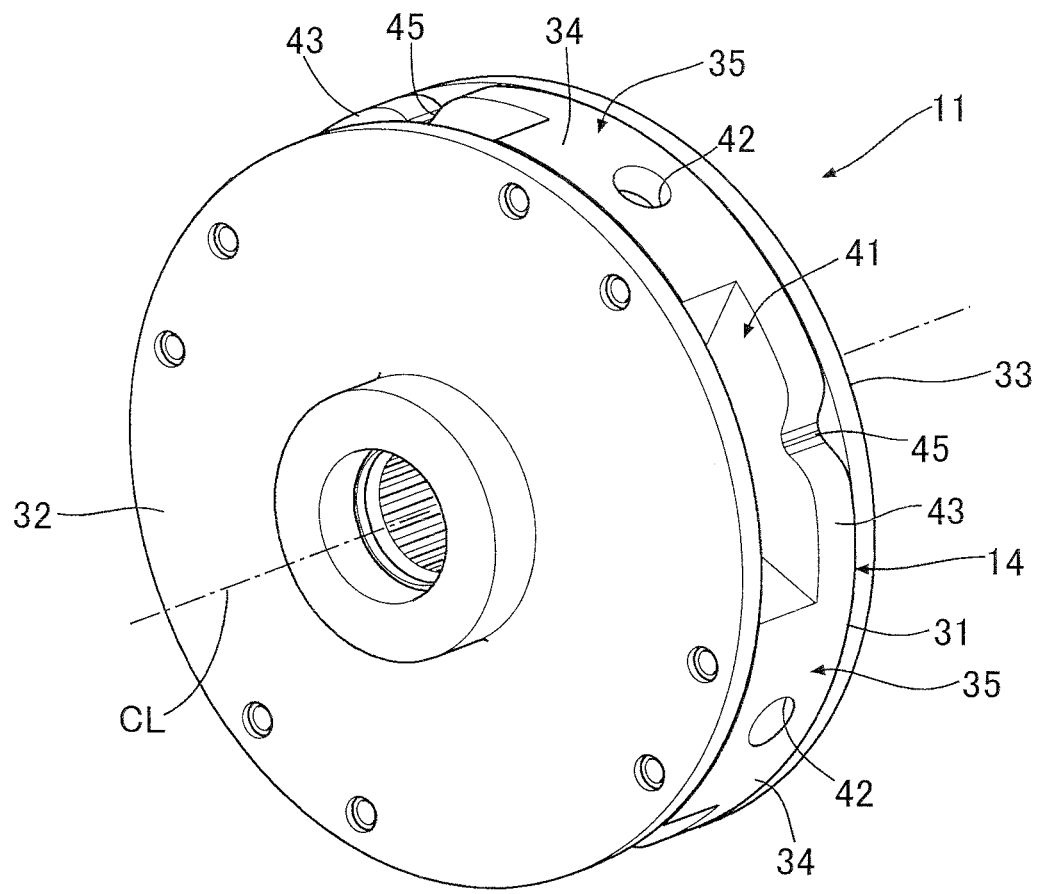
FIG. 2 is an enlarged perspective view of the differential device. (first embodiment)

11 Differential device
14 Differential case (input member)
25 First side gear (side gear, first output gear, output gear)
26 Second side gear (side gear, second output gear, output gear)
27 Pinion gear (differential gear)
28 Pinion shaft (shaft, differential gear support member)
31 Support member
32 First cover member
33 Second cover member
34 Surrounding wall (wall part)
35 Opposite ends-supporting part
35a Inner end-side support portion (one support portion, other support portion)
35b Outer end-side support portion (other support portion, one support portion)
41 Recess part (recessed hole)
45 Depression part
46 Cavity (space, first space)
47 Opening (wall opening)
48 Shaft hole (through hole)
51 Support member
52 Concave space (recess part)
53 Linking plate (linking part)
134 Surrounding wall (wall part)
135 Opposite ends-supporting part
135a Inner end-side support portion (one support portion, other support portion)
150 Side face part

MODES FOR CARRYING OUT THE INVENTION

One embodiment of the present invention is explained below by reference to the attached drawings.

First Embodiment

FIG. 1 schematically shows the overall arrangement of a differential device 11 related to a first embodiment of the present invention. An automobile includes for example a transmission case 12 that is disposed next to an engine (not illustrated) as a power source mounted in the automobile and houses a transmission (not illustrated) or the differential device 11. For example, a pair of left and right output shafts 13a and 13b each linked to an axle are supported on the transmission case 12 so that they can rotate around a central axis CL. The two output shafts 13a and 13b are disposed coaxially with each other and each have one end joined to the differential device 11 within the transmission case 12.

The differential device 11 includes for example a differential case 14 supported on the transmission case 12 so that it can rotate around the central axis CL, a first side gear 25 rotating around the central axis CL, a second side gear 26 opposing the first side gear 25 and rotating relative to the first side gear 25 around the central axis CL, a plurality of pinion gears 27 disposed between the first side gear 25 and the second side gear 26 and each meshing with the pair of side gears 25 and 26, and a pinion shaft 28 supporting each pinion gear 27.

When supporting the differential case 14, a bearing 15 is disposed on the differential case 14. Joined to the differential case (input member) 14 is for example an output member 17 of a reduction gear mechanism 16. Power of the engine is transmitted to the reduction gear mechanism 16 from the transmission. The reduction gear mechanism 16 is formed as for example a planetary gear mechanism. That is, the reduction gear mechanism 16 includes for example a carrier 21, a sun gear 18 having outward-facing gear teeth on the outer periphery around the central axis CL and rotating around the central axis CL in association with an output shaft of the transmission, a ring gear 19 fixed to an inner wall of the transmission case 12 while surrounding the sun gear 18 so as to be concentric with the sun gear 18 and having inward-facing gear teeth opposing the gear teeth of the sun gear 18, and a planetary gear 22 disposed between the sun gear 18 and the ring gear 19, meshing with the gear teeth of the sun gear 18 and the gear teeth of the ring gear 19, and supported on the carrier 21 so that it can rotate around a rotational axis RT that is parallel to the central axis CL and positioned equidistant from the central axis CL.

The carrier 21 is joined to the differential case 14 so that it cannot rotate relative thereto around the central axis CL. In other words, the carrier 21 rotates together with the differential case 14. The carrier 21 functions as the output member 17 of the reduction gear mechanism 16. The differential case 14 functions as an input member of the differential device 11. The reduction gear mechanism 16 may be formed from a gear train of a plurality of spur gears instead of the planetary gear mechanism.

An annular seal member 24 is for example disposed between the transmission case 12 and each of the output shafts 13a and 13b. In FIG. 1 only one seal member 24 is illustrated. The seal member 24 provides a liquid-tight block between the transmission case 12 and the rotating output shafts 13a and 13b. In this embodiment, an oil pan (not illustrated) is formed in a bottom part of the transmission case 12, the oil pan facing the internal space of the transmission case 12 and storing a predetermined amount of lubricating oil. Stored lubricating oil is scooped up and scattered around by a movable element of the reduction gear mechanism 16 or rotation of the differential case 14 in the internal space of the transmission case 12. In this way, mechanically moving portions present inside and outside the differential case 14 are lubricated with lubricating oil scattered.

The first side gear (side gear, first output gear, output gear) 25 includes for example a cylindrical first shaft portion 25a spline joined to an inner end part of the output shaft 13a, an annular first tooth portion 25c present at a position spaced from the first shaft portion 25a to the outside in the radial direction of the side gears 25 and 26 and having first gear teeth 25b meshing with the plurality of pinion gears 27, and a first intermediate wall portion 25d extending to the outside in the radial direction of the side gears 25 and 26 from an inner end part, in the axial direction of the side gears 25 and 26, of the first shaft portion 25a toward an inner peripheral end part, in the radial direction of the side gears 25 and 26, of the first tooth portion 25c. Because of this, relative rotation around the central axis CL between the output shaft 13a and the first side gear 25 is prevented. The first intermediate wall portion 25d provides an integral connection between the first shaft portion 25a and the inner peripheral end part of the first tooth portion 25c.

The second side gear (side gear, second output gear, output gear) 26 includes for example a cylindrical second shaft portion 26a facing the first shaft portion 25a and spline joined to an inner end part of the output shaft 13b, which faces the output shaft 13a, an annular second tooth portion 26c facing the first tooth portion 25c, present at a position spaced from the second shaft portion 26a to the outside in the radial direction of the side gears 25 and 26, and having second gear teeth 26b meshing with the plurality of pinion gears 27, and a second intermediate wall portion 26d extending to the outside in the radial direction of the side gears 25 and 26 from an inner end part, in the axial direction of the side gears 25 and 26, of the second shaft portion 26a toward an inner peripheral end part, in the radial direction of the side gears 25 and 26, of the second tooth portion 26c. Because of this, relative rotation around the central axis CL between the output shaft 13b and the second side gear 26 is prevented. The second intermediate wall portion 26d provides an integral connection between the second shaft portion 26a and the inner peripheral end part of the second tooth portion 26c.

The plurality of pinion gears (differential gears) 27 are each disposed so that they can rotate around a rotational axis RL extending radially from the central axis CL. Formed on each pinion gear 27 are gear teeth 27a meshing with the first gear teeth 25b and the second gear teeth 26b. The plurality of pinion gears 27 are housed in the differential case 14, can spin with respect to the differential case 14, and can revolve around the central axis CL accompanying rotation of the differential case 14.

Each pinion shaft (shaft, differential gear support member) 28 is disposed so as to be coaxial with the rotational axis RL extending radially from the central axis CL. Each pinion shaft 28 projects for example inward and outward, in the radial direction on the side gears 25 and 26, of the pinion gear 27 on the rotational axis RL. Formed in each pinion shaft 28 so as to extend therethrough is a hole into which a pin 36 functioning as a retainer, which is described later, can be inserted. Instead of such a pinion shaft 28 for each pinion gear 27, for example, one pinion shaft intersecting the central axis CL may be used in common for two (a plurality of) pinion gears disposed at a central angle of 180 degrees around the central axis CL.

The differential case 14 has for example a support member 31, a first cover member 32, and a second cover member 33.

The first cover member 32 is disposed for example on the back side of the first side gear 25, can be linked (can be connected) to one side face of the support member 31, and has a cylindrical boss part in a central part of a face that is opposite to a face opposing the support member 31. The second cover member 33 for example opposes the first cover member 32, is disposed on a back side of the second side gear 26, and can be linked (can be connected) to the other side face of the support member 31. Furthermore, the second cover member 33 has for example a cylindrical boss part in a central part of a face that is opposite to a face opposing the support member 31. The bearing 15 is mounted on the boss part of the second cover member 33. The support member 31 is disposed for example between the first cover member 32 and the second cover member 33. The support member 31 is for example an annular member and its central part is a cavity 46. That is, the cavity (space) 46 is formed in the central part of the support member 31.

Figure 3:
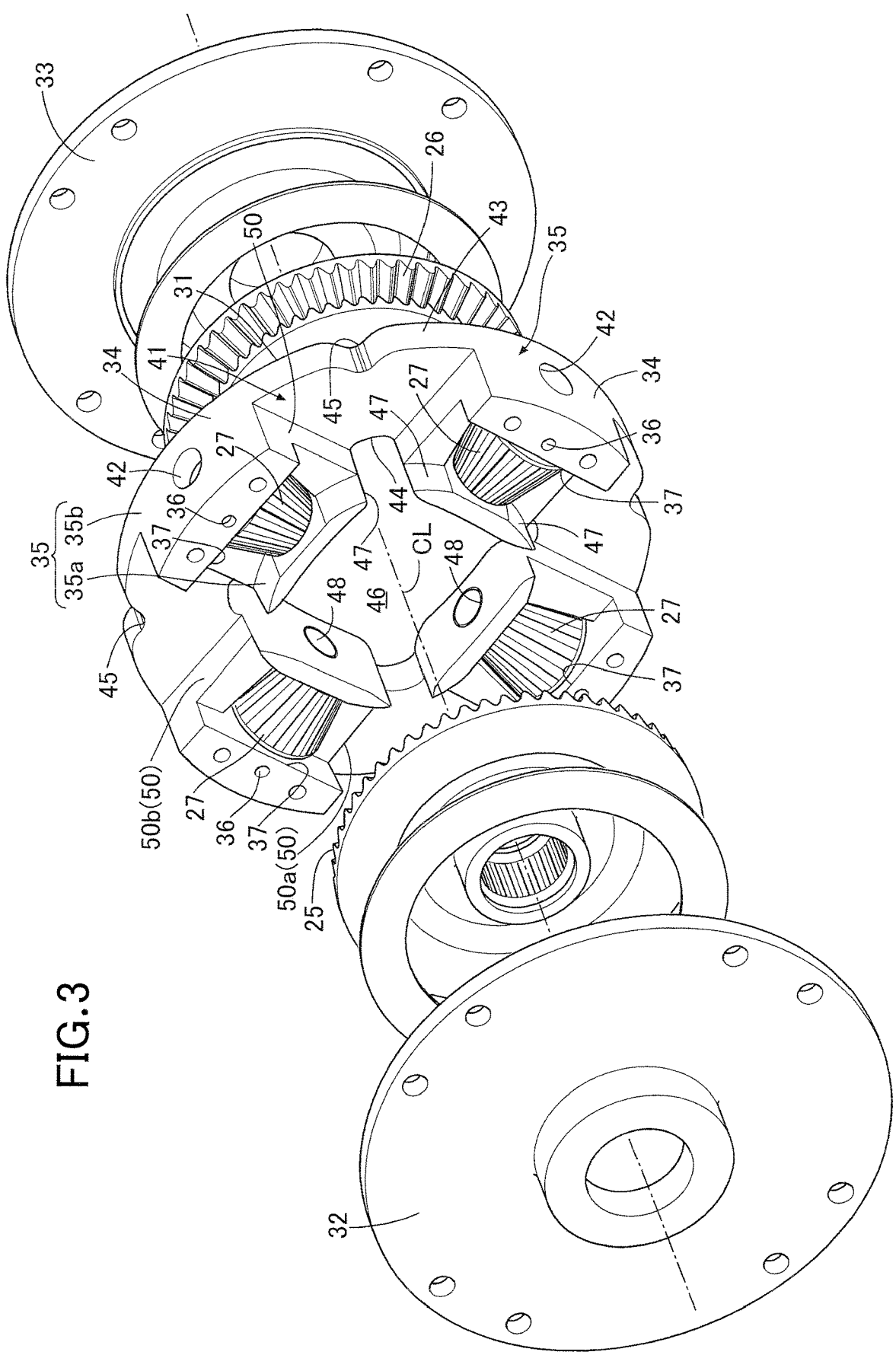
FIG. 3 is an exploded perspective view of the differential device. (first embodiment)

The support member 31 for example has, radially around the central axis CL, a plurality of surrounding walls 34 each surrounding one pinion gear 27, the surrounding walls 34 being capable of rotating around the central axis CL, and a plurality of linking plates (linking parts) 43 linking (connecting) two adjacent surrounding walls 34. In this embodiment, as shown in FIG. 3, four of the surrounding walls 34 are formed radially around the central axis CL. The respective surrounding walls 34 are disposed for example at equal intervals in the peripheral direction of the central axis CL.

Each surrounding wall (wall part) 34 has for example an opposite ends-supporting part 35 supporting opposite end parts (one end part and the other end part) of the pinion shaft 28 and a plurality of side face parts 50 connecting the opposite ends-supporting part 35. A shaft hole 48 is formed in an inner wall of each surrounding wall 34, that is, an inner end-side support portion (one support portion, other support portion) 35a of the opposite ends-supporting part 35, the shaft hole 48 extending through the inner end-side support portion 35a. That is, the shaft hole (through hole) 48 of each inner end-side support portion 35a opens up to the cavity 46 in the central part of the support member 31 (opens at an inner end face of the inner end-side support portion 35a). A shaft hole 42 is formed in an outer wall of each surrounding wall 34, that is, an outer end-side support portion (other support portion, one support portion) 35b of the opposite ends-supporting part 35, the shaft hole 42 extending through the outer end-side support portion 35b. That is, the shaft hole 42 of each outer end-side support portion 35b opens at an outer peripheral face of the outer end-side support portion 35b.

An inner end part (one end part) of each pinion shaft 28 is inserted into the shaft hole 48 of each inner end-side support portion 35a. An outer end part (other end part) of the pinion shaft 28 is inserted into the shaft hole 42 of each outer end-side support portion 35b. An outer peripheral face of each outer end-side support portion 35b forms an outer peripheral face of the support member 31. A hole is formed in each outer end-side support portion 35b, the pin 36 having an axis parallel to the central axis CL, functioning as a retainer, and being capable of being inserted into the hole. Because of this, inserting the pin 36 into each outer end-side support portion 35b and pinion shaft 28 prevents the pinion shaft 28 from coming out of the support member 31, thus supporting the pinion shaft 28 on the support member 31.

A recess part 41 is formed between two adjacent opposite ends-supporting parts 35, the recess part 41 being recessed for example from an outer peripheral side of the support member 31 toward an inner peripheral side. The recess part 41 defines a space to which at least one of the first side gear 25 and the second side gear 26 is exposed between the first cover member 32 and the second cover member 33. The recess part (recessed hole) 41 communicates with for example the cavity 46. That is, the recess part 41 opens on the inside in the radial direction of the support member 31. That is, the recess part 41 extends from the outside in the radial direction to the inside in the radial direction of the support member 31. Because of this, the differential device 11 can send, via the recess part 41, lubricating oil that has dropped down from the transmission case 12, from the outside, in the radial direction of the support member 31, to the center side of the differential device 11.

The plurality of linking plates 43 link (connect) the plurality of surrounding walls 34 by means of each of the plurality of linking plates 43 being connected to two adjacent surrounding walls 34. An outer peripheral face, in the radial direction of the support member 31, of the linking plate 43 forms an outer peripheral face of the support member 31. For example, a depression part 45 is formed in part of the outer peripheral face, in the radial direction of the support member 31, of the linking plate 43. The depression part 45 is indented from an outer peripheral face, in the radial direction of the support member 31, of the linking plate 43 toward an inner peripheral face in the radial direction of the support member 31 (from the outside, in the radial direction of the support member 31, toward the inside). In the present embodiment, the depression part 45 (more specifically a face of the depression part 45) is formed as a curved face having a generatrix parallel to the central axis CL.

For example, an opening (wall opening) 47 from the outside to the inside of the surrounding wall 34 is formed in part of one side face portion 50a (50) of the surrounding wall 34 as a side face of the recess part 41 and one end portion 35aa in the peripheral direction of the inner end support portion 35a of the opposite ends-supporting part 35, and also in part of the other side face portion 50b (50) of the surrounding wall 34 as a side face of the recess part 41 and the other end portion 35ab in the peripheral direction of the inner end support portion 35a of the opposite ends-supporting part 35. The opening 47 communicates with a space of the recess part 41. Because of this, lubricating oil that has dropped down from the transmission case 12 can be sent from the outside, in the radial direction of the support member 31, to the interior of the surrounding wall 34 via the recess part 41 and the opening 47.

That is, lubricating oil that has dropped down from the transmission case 12 can be sent from the outside, in the radial direction of the support member 31, to the pinion gear 27 via the recess part 41 and the opening 47 or from the outside, in the radial direction of the support member 31, to the outer periphery of the pinion shaft 28 via the recess part 41, the opening 47, and a washer 70.

In this embodiment, the opening 47 is formed in opposite side face parts 50 (50a, 50b) of the surrounding wall 34, but the present invention is not limited thereto. In the present invention, for example, the opening 47 may be formed in either one of the opposite side face parts 50 (50a, 50b) of the surrounding wall 34 (preferably the side face part 50 on the forward side, in the rotational direction of the differential case 14, of the surrounding wall 34).

In the present embodiment, the opening 47 is formed in the side face parts 50 of all of the surrounding walls 34, but the present invention is not limited thereto. In the present invention, for example, the opening 47 may be formed in any one of the surrounding walls 34 or a plurality of the surrounding walls 34 but not all of the surrounding walls 34. In this case, with regard to the recess part 41 formed between two adjacent opposite ends-supporting parts 35, the same number of recess parts 41 may be formed as there are surrounding walls 34 in which the opening 47 is formed.

The operation of this embodiment is now explained. In the differential device 11 of the embodiment, when the differential case 14 receives rotational power from the engine via the reduction gear mechanism 16, the plurality of pinion gears 27 revolve around the central axis (rotational axis) CL of the differential case 14 together with the differential case 14 without spinning around the rotational axis RL. In this process, the left and right side gears 25 and 26 are rotated at the same speed by the differential case 14 via the plurality of pinion gears 27, and the driving force of the side gears 25 and 26 is evenly transmitted between the left and right output shafts 13a and 13b. When there is a difference in rotational speed between the left and right output shafts 13a and 13b due to the automobile turning, the plurality of pinion gears 27 revolve around the central axis (rotational axis) CL of the differential case 14 while spinning, thereby transmitting the rotational driving force from the pinion gear 27 to the left and right side gears 25 and 26 while allowing differential rotation. The above is the same as in the operation of a conventionally known differential device.

Lubrication of the pinion gear 27 and the outer periphery of the pinion shaft 28 in the differential device 11 of the present embodiment is carried out for example as follows.

Part of the lubricating oil that has dropped down from the transmission case 12 is guided to the cavity 46 from the outside, in the radial direction of the support member 31, of the differential device 11 via the recess part 41. Lubricating oil that has been guided to the cavity 46 is guided to the interior of the surrounding wall 34 via the shaft hole 48 of the surrounding wall 34 (more specifically, the inner end support portion 35a of the opposite ends-supporting part 35) positioned further downward than the cavity 46 in the direction of gravity. Lubricating oil that has been guided to the interior of the surrounding wall 34 via the shaft hole 48 travels along the outer periphery of the pinion shaft 28 (the surface of the pinion shaft 28 sliding against the pinion gear 27) inserted into the shaft hole 48 or an end face of the pinion gear 27 (more specifically, an inner end face of the pinion gear 27 in the axial direction) and lubricates the gear teeth 27a of the pinion gear 27. When the differential case 14 is rotating, that is, when the support member 31 is rotating, the surrounding wall 34 to which lubricating oil is guided from the cavity 46 changes accordingly.

Another part of the lubricating oil that has dropped down from the transmission case 12 is guided from the outside, in the radial direction of the support member 31, of the differential device 11 via the recess part 41 and the opening 47 directly to the pinion gear 27 or further via the washer 70 to the outer periphery of the pinion shaft 28. Part of the lubricating oil that has been guided directly to the pinion gear 27 directly lubricates the gear teeth 27a. Another part of the lubricating oil that has been guided directly to the pinion gear 27 is further guided to the outer periphery of the pinion shaft 28 along an end face of the pinion gear 27 (more specifically, an inner end face or an outer end face in the axial direction of the pinion gear 27) and lubricates the outer periphery of the pinion shaft 28 (the surface of the pinion shaft 28 sliding against the pinion gear 27). Lubricating oil that has been guided to the outer periphery of the pinion shaft 28 via the recess part 41, the opening 47, and the washer 70 lubricates the outer periphery of the pinion shaft 28 (the surface of the pinion shaft 28 sliding against the pinion gear 27).

Another part of the lubricating oil that has dropped down from the transmission case 12 is guided to the interior of the differential device 11 from the shaft hole 42 of each outer end-side support portion 35b of the support member 31 of the differential device 11. Lubricating oil that has been guided from the shaft hole 42 to the interior of the differential device 11 lubricates the outer periphery of the pinion shaft 28 (the surface of the pinion shaft 28 sliding against the pinion gear 27) inserted into the shaft hole 42 or the gear teeth 27a of the pinion gear 27 after traveling along the outer periphery of the pinion shaft 28 and the end face of the pinion gear 27 (more specifically, the outer end face of the pinion gear 27 in the axial direction) or the washer 70.

In accordance with the present embodiment, the differential device 11 can guide lubricating oil that has dropped down from the transmission case 12 from the outside, in the radial direction of the support member 31, toward the central axis CL, that is, the cavity 46 formed in the central part of the support member 31, and can send lubricating oil that has been guided to the cavity 46, to the pinion gear 27 and the outer periphery of the pinion shaft 28 (the surface of the pinion shaft 28 sliding against the pinion gear 27) via the shaft hole 48 of the opposite ends-supporting part 35 of the support member 31. The differential device 11 can thereby lubricate the outer periphery of the pinion shaft 28 and the pinion gear 27 with lubricating oil that has dropped down from the transmission case 12. Because of this, the lubrication performance of the pinion gear 27 can be improved. The anti-seizure performance of the pinion gear 27 can thereby be improved.

Furthermore, in accordance with the present embodiment, in the differential device 11, the opening 47 from the outside to the inside of the surrounding wall 34 is formed in the side face part 50 of at least one surrounding wall 34. Because of this, lubricating oil that has been guided to the opening 47 is guided from the opening 47 to the pinion gear 27 or the outer periphery of the pinion shaft 28 via the washer 70. Lubricating oil that has dropped down from the transmission case 12 can thereby lubricate the pinion gear 27 or the outer periphery of the pinion shaft 28 without being sent to the central axis CL side of the support member 31. Because of this, the lubrication performance of the pinion gear 27 can be improved. The anti-seizure performance of the pinion gear 27 can thereby be improved.

In accordance with this embodiment, the depression part 45 is formed in part of the outer peripheral face, in the radial direction of the support member 31, of the linking plate 43. Hollowing out of the support member 31 is thereby realized, thus enabling a light weight to be achieved for the support member 31. Consequently, the overall weight of the differential device 11 can be lightened.

Furthermore, in accordance with the present embodiment, in the differential device 11, since the shaft hole 42 of each outer end-side support portion 35b of the support member 31 opens on the outer peripheral face of the outer end-side support portion 35b, lubricating oil that has dropped down from the transmission case 12 can be sent to the outer periphery of the pinion shaft 28 (the surface of the pinion shaft 28 sliding against the pinion gear 27) and the pinion gear 27 via the shaft hole 42 of the opposite ends-supporting part 35 of the support member 31. The differential device 11 can thereby lubricate the outer periphery of the pinion shaft 28 and the pinion gear 27 with lubricating oil that has dropped down from the transmission case 12. Because of this, the lubrication performance of the pinion gear 27 can be improved. The anti-seizure performance of the pinion gear 27 can thereby be improved.

In the first embodiment, as a modified example, the support member 31 can be formed only from the surrounding wall 34 without the linking plate 43 by linking the inner end-side support portions 35a of the opposite ends-supporting parts 35 of two adjacent surrounding walls 34. In this case, a cutout is provided, of the linking parts of two adjacent inner end-side support portions 35a, in part, in the axial direction of the support member 31, of at least one inner end-side support portion 35a, that is, in part in the axial direction of the support member 31 of at least one of one end portion 35a a in the peripheral direction and the other end portion 35a b in the peripheral direction of the inner end support portion 35a. The recess part 41 formed between the two adjacent surrounding walls 34 can thereby extend from the outside in the radial direction to the inside in the radial direction of the support member 31. Because of this, the effects of the first embodiment can be obtained in the modified example of the first embodiment.

A second embodiment of the present invention is now explained by reference to FIG. 4. The second embodiment is different from the first embodiment mainly in terms of the arrangement of the support member. Because of this, in the second embodiment the arrangement that is different from the first embodiment is explained, and where the arrangement is the same as that of the first embodiment it is denoted by the same reference numerals and symbols, detailed explanation thereof being omitted.

Second Embodiment

Figure 4:
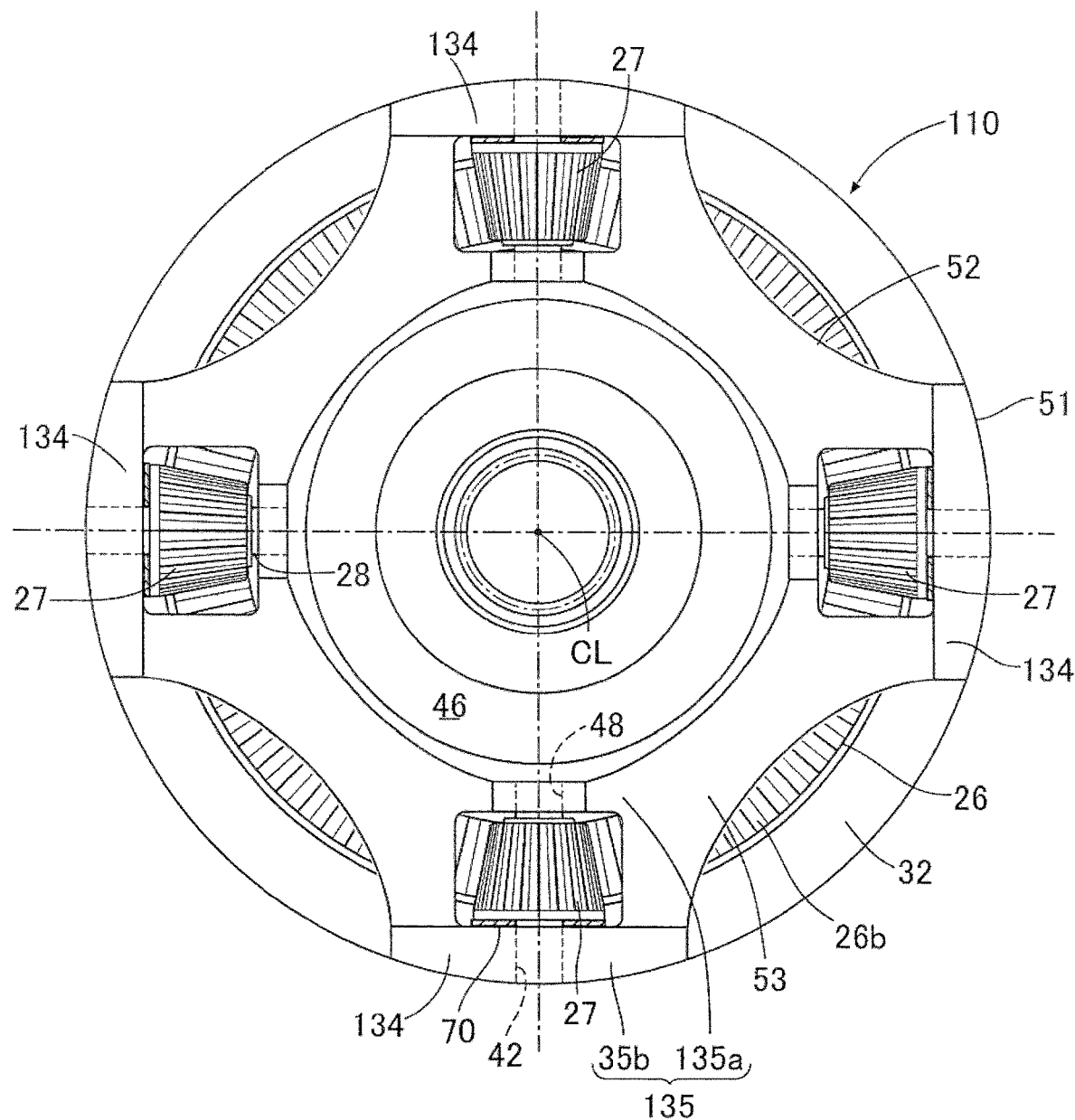
FIG. 4 is a front view schematically showing a support member related to a second embodiment. (second embodiment)

FIG. 4 schematically shows the arrangement of a support member 51 related to the second embodiment of the present invention. The support member 51 of the second embodiment has for example a plurality of surrounding walls (wall parts) 134 comprising an opposite ends-supporting part 135 each supporting opposite end parts (one end part and the other end part) of the pinion shaft 28, and a linking plate (linking part) 53 linking two adjacent surrounding walls 134. The linking plate (linking part) 53 of the second embodiment is different from the linking plate (linking part) 43 of the first embodiment, and is formed only on the inside in the radial direction of the support member 51 (that is, an inner end support portion 135a side of the opposite ends-supporting part 135). In other words, two adjacent surrounding walls 134 (that is, two adjacent opposite ends-supporting parts 135) are linked by means of the linking plate 53 formed on the inside in the radial direction of the support member 51 (the inner end support portion 135a side of the opposite ends-supporting part 135).

A concave space (recess part) 52 is formed on the outside in the radial direction of the support member 51 (on the outer end-side support portion 35b side of the opposite ends-supporting part 135) between two adjacent surrounding walls 134 (that is, two adjacent opposite ends-supporting part 135), the concave space 52 being formed so as to be recessed from the outer peripheral side of the support member 51 toward the inner peripheral side. The concave space 52 defines a space to which the first side gear 25 and the second side gear 26 are exposed between the first cover member 32 and the second cover member 33.

The support member 51 of the second embodiment has for example an arrangement other than the outer peripheral wall of the surrounding wall 134 (the outer end-side support portion 35b of the opposite ends-supporting part 135) linking (connecting) the first cover member 32 and the second cover member 33, that is, it is formed so that the linking plate 53, the inner end-side support portion 135a of the opposite ends-supporting part 135, and a side face part 150 of the surrounding wall 134 have a smaller thickness in the axial direction of the support member 51 than that of the outer peripheral wall of the surrounding wall 134. Because of this, the linking plate 53, the inner end-side support portion (one support portion, other support portion) 135a of the opposite ends-supporting part 135, and the side face part 150 of the surrounding wall 134 form a space (second space) between themselves and the first cover member 32 and second cover member 33.

Here, in the space (second space) formed between the linking plate 53, inner end-side support portion 135a of the opposite ends-supporting part 135, and side face part 150 of the surrounding wall 134 and the first cover member 32 and second cover member 33, the space extending in the radial direction of the support member 51 (that is, in the radial direction of the side gears 25 and 26) is sometimes called a space in the radial direction and the space extending toward the peripheral direction of the support member 51 (that is, in the peripheral direction of the side gears 25 and 26) is sometimes called a space in the peripheral direction.

Because of this, lubrication of the pinion gear 27 and the outer periphery of the pinion shaft 28 in the differential device 110 of the second embodiment is for example carried out as follows.

Part of the lubricating oil that has dropped down from the transmission case 12 is guided from the outside, in the radial direction of the support member 51, of the differential device 110 to the concave space 52 and the cavity (first space, space) 46 via a space between the linking plate 53 and the first cover member 32 (more specifically, the space in the radial direction) or to a space between the linking plate 53 and the second cover member 33 (more specifically, the space in the radial direction). Lubricating oil that has been guided to the cavity 46 is guided to the interior of the surrounding wall 134 via the shaft hole 48 of the surrounding wall 134 (more specifically, the inner end support portion 135a of the opposite ends-supporting part 135) positioned further downward than the cavity 46 in the direction of gravity.

Lubricating oil that has been guided to the interior of the surrounding wall 134 via the shaft hole 48 lubricates the outer periphery of the pinion shaft 28 (the surface of the pinion shaft 28 sliding against the pinion gear 27) inserted into the shaft hole 48 or the gear teeth 27a of the pinion gear 27 along an end face of the pinion gear 27 (more specifically, the inner end face in the axial direction of the pinion gear 27). In addition, when the differential case 14 is rotating, that is, when the support member 51 is rotating, the surrounding wall 134 to which lubricating oil is guided from the cavity 46 changes accordingly.

Another part of the lubricating oil that has dropped down from the transmission case 12 is guided directly to the pinion gear 27 from the outside, in the radial direction of the support member 51, of the differential device 110 via the concave space 52 and the space between the side face part 150 of the surrounding wall 134 and the first cover member 32 (more specifically, the space in the peripheral direction) or the space between the side face part 150 of the surrounding wall 134 and the second cover member 33 (more specifically, the space in the peripheral direction).

Part of the lubricating oil that has been guided directly to the pinion gear 27 directly lubricates the gear teeth 27a. Another part of the lubricating oil that has been guided directly to the pinion gear 27 is further guided to the outer periphery of the pinion shaft 28 along an end face of the pinion gear 27 (more specifically, the inner end face or the outer end face in the axial direction of the pinion gear 27) and lubricates the outer periphery of the pinion shaft 28 (the surface of the pinion shaft 28 sliding against the pinion gear 27).

Therefore, in accordance with the second embodiment, the differential device 110 can guide lubricating oil that has dropped down from the transmission case 12, from the outside, in the radial direction of the support member 51, toward the cavity 46 via the concave space 52 and can send lubricating oil that has been guided to the cavity 46 to the pinion gear 27 and the outer periphery of the pinion shaft 28 (the surface of the pinion shaft 28 sliding against the pinion gear 27) via the shaft hole 48 of the opposite ends-supporting part 135 of the support member 51. It is thereby possible to lubricate the pinion gear 27 or the outer periphery of the pinion shaft 28 in the same manner as in the first embodiment. Because of this, the lubrication performance of the pinion gear 27 can be improved. The anti-seizure performance of the pinion gear 27 can thereby be improved.

Furthermore, in accordance with the second embodiment, since the linking plate 53 is formed only on the inside in the radial direction of the support member 51 (that is, the inner end support portion 135a side of the opposite ends-supporting part 135), it is possible to lighten the weight of the support member 51 without decreasing the stiffness necessary for the surrounding wall 134. Consequently, the overall weight of the differential device 110 can be lightened.

Moreover, in accordance with the second embodiment, the concave space 52 is a space to which the first side gear 25 and the second side gear 26 are exposed between the first cover member 32 and the second cover member 33. Furthermore, the side face part 150 of the surrounding wall 134 is formed so as to have a smaller thickness in the axial direction of the support member 51 than the outer peripheral wall of the surrounding wall 134 (more specifically, the outer end-side support portion 35b of the opposite ends-supporting part 135). Because of this, lubricating oil that has dropped down from the transmission case 12 can be introduced via the concave space 52 to the pinion gear 27 or to the outer periphery of the pinion shaft 28 via the washer 70.

In accordance with the second embodiment also, in the same manner as in the first embodiment, lubricating oil that has dropped down from the transmission case 12 can be sent to the pinion gear 27 or the outer periphery of the pinion shaft 28 via the washer 70 without being sent to the central axis CL side of the support member 51. It is thereby possible to lubricate the pinion gear 27 or the outer periphery of the pinion shaft 28. Therefore, in accordance with the second embodiment also, the lubrication performance of the pinion gear 27 can be improved. In the second embodiment also, the anti-seizure performance of the pinion gear 27 can be improved thereby.

Furthermore, in accordance with the second embodiment, in the same manner as in the first embodiment, since the shaft hole 42 of each outer end-side support portion 35b of the support member 51 opens on the outer peripheral face of the outer end-side support portion 35b, lubricating oil that has dropped down from the transmission case 12 can be sent to the pinion gear 27 and the outer periphery of the pinion shaft 28 (the surface of the pinion shaft 28 sliding against the pinion gear 27) via the shaft hole 42 of the opposite ends-supporting part 35 of the support member 51. It is thereby possible for the differential device 11 to lubricate the pinion gear 27 and the outer periphery of the pinion shaft 28 with lubricating oil that has dropped down from the transmission case 12. Because of this, the lubrication performance of the pinion gear 27 can be improved. The anti-seizure performance of the pinion gear 27 can thereby be improved.

Embodiments of the present invention are explained above, but the present invention is not limited to the above embodiments and may be modified in a variety of ways as long as the modifications do not depart from the subject matter thereof.

In the first embodiment and the second embodiment, the differential devices 11, 110 and the reduction gear mechanism 16 are formed as separate bodies, but the present invention is not limited thereto. In the present invention, for example, either one of the first cover member 32 and the second cover member 33 of the differential devices 11, 110 may be formed integrally with the carrier of the reduction gear mechanism 16. It is thereby possible to reduce the thickness in the central axis CL direction when the differential devices 11, 110 are joined to the reduction gear mechanism 16. As a result, this can contribute to a reduction in the width of the differential devices 11, 110 and the reduction gear mechanism 16. Furthermore, the overall weight of the differential devices 11, 110 and the reduction gear mechanism 16 can be lightened.

Moreover, in the first embodiment and the second embodiment, the cavity 46 is provided in the central part of the support members 31, 51, but the present invention is not limited thereto. In the present invention, for example, the cavity 46 may not be provided in the central part of the support members 31, 51. In this case, an effect that is obtained by utilizing the cavity 46 in the present invention cannot be obtained, but an effect that is obtained without utilizing the cavity 46 in the present invention can be obtained.

The invention claimed is:

1. A differential device comprising
a plurality of differential gears,
a plurality of differential gear support members respectively supporting the plurality of differential gears,
a pair of output gears meshing with each of the plurality of differential gears,
a support member having a plurality of opposite ends-supporting parts supporting opposite end parts of the respective differential gear support member, a space being formed in a middle part of the support member,
a first cover member disposed on a back face side of one of the output gears and capable of being joined to the support member, and
a second cover member disposed on a back face side of the other output gear and capable of being joined to the support member,
a recess part being formed between two of the opposite ends-supporting parts of the support member that are adjacent to each other, the recess part extending from an outside in a radial direction of the support member toward an inside in the radial direction,
each of the plurality of opposite ends-supporting parts having one support portion supporting at least one end part of the differential gear support member, and
a through hole being formed in said one support portion, the through hole extending through said one support portion.

2. The differential device according to claim 1, wherein the support member has a plurality of wall parts each equipped with the opposite ends-supporting part, and
an opening from an outside to an inside of the wall part is formed in at least one of the wall parts.

3. The differential device according to claim 2, wherein with regard to the support member, a depression part is formed in a face of the recess part forming one side face or bottom face, the depression part being directed from the outside in the radial direction to the inside in the radial direction of the support member.

4. The differential device according to claim 1, wherein with regard to the support member, a depression part is formed in a face of the recess part forming one side face or bottom face, the depression part being directed from the outside in the radial direction to the inside in the radial direction of the support member.

5. A differential device comprising
a plurality of differential gears,
a plurality of differential gear support members respectively supporting the plurality of differential gears,
a pair of output gears meshing with each of the plurality of differential gears,
a support member having a plurality of opposite ends-supporting parts supporting opposite end parts of the respective differential gear support member and a plurality of linking parts linking two of the plurality of opposite ends-supporting parts that are adjacent to each other, a space being formed in a middle part of the support member,
a first cover member disposed on a back face side of one of the output gears and capable of being joined to the support member, and
a second cover member disposed on a back face side of the other output gear and capable of being joined to the support member,
the linking part and a recess part being formed between two of the opposite ends-supporting parts of the support member that are adjacent to each other, the linking part being on an inside in a radial direction of the support member and the recess part being on an outside in the radial direction of the support member,
a space in the radial direction being formed in the linking part, the space extending in the radial direction of the support member between the linking part and the first cover member and second cover member,
each of the plurality of opposite ends-supporting parts having one support portion supporting at least one end part of the differential gear support member, and a through hole being formed in said one support portion, the through hole extending through said one support portion.

6. A differential device comprising
a plurality of differential gears,
a plurality of differential gear support members respectively supporting the plurality of differential gears,
a pair of output gears meshing with each of the plurality of differential gears,
a support member having a plurality of wall parts comprising opposite ends-supporting parts supporting opposite end parts of the respective differential gear support member,
a first cover member disposed on a back face side of one of the output gears and capable of being joined to the support member, and
a second cover member disposed on a back face side of the other output gear and capable of being joined to the support member,
two of the wall parts that are adjacent to each other being connected directly or by means of a plurality of linking parts,
a recess part being formed between two of the wall parts that are adjacent to each other, the recess part being recessed from an outside in a radial direction of the support member toward an inside in the radial direction, and
an opening from an outside to an inside of the wall part being formed in at least one of the wall parts.

7. A differential device comprising
a plurality of differential gears,
a plurality of differential gear support members respectively supporting the plurality of differential gears,
a pair of output gears meshing with each of the plurality of differential gears,
a support member having a plurality of wall parts and a plurality of linking parts linking two of the wall parts that are adjacent to each other, the plurality of wall parts having opposite ends-supporting parts supporting opposite end parts of the respective differential gear support member and a side face part connecting the opposite ends-supporting parts,
a first cover member disposed on a back face side of one of the output gears and capable of being joined to the support member, and
a second cover member disposed on a back face side of the other output gear and capable of being joined to the support member,
the linking part and a recess part being formed between two of the wall parts of the support member that are adjacent to each other, the linking part being on an inside in a radial direction of the support member and the recess part being on an outside in the radial direction of the support member, and
a space in a peripheral direction being formed in the side face part, the space extending in the peripheral direction of the support member between the side face part and each of the first cover member and the second cover member.

* * * * *